(12) United States Patent
Li et al.

(10) Patent No.: US 12,482,157 B2
(45) Date of Patent: Nov. 25, 2025

(54) DATA AUGMENTATION DEVICE, METHOD, AND NON-TRANSITORY COMPUTER READABLE STORAGE MEDIUM

(71) Applicant: HON HAI PRECISION INDUSTRY CO., LTD., New Taipei (TW)

(72) Inventors: Yung-Hui Li, New Taipei (TW); Van Nhiem Tran, New Taipei (TW); Chi-En Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 210 days.

(21) Appl. No.: 18/300,403

(22) Filed: Apr. 14, 2023

(65) Prior Publication Data

US 2023/0334741 A1 Oct. 19, 2023

Related U.S. Application Data

(60) Provisional application No. 63/362,965, filed on Apr. 14, 2022.

(51) Int. Cl.
*G09G 5/00* (2006.01)
*G06T 11/60* (2006.01)

(52) U.S. Cl.
CPC .................. *G06T 11/60* (2013.01)

(58) Field of Classification Search
CPC ......... G06T 11/60; G06T 19/00; G06T 11/00; G06T 11/20; G06T 11/206; G06T 7/0012; G06T 2207/10081; G06T 2207/30004; G06F 9/4443; G06F 3/0481; G06F 30/13; G06F 3/04845; G06F 3/04883; G06F 40/143; G06F 16/54; G06F 16/56; G06F 16/5838; G06V 20/20; G06V 10/7753; G11B 27/10; H04N 21/47217; G16H 30/20
USPC ....................................................... 345/619
See application file for complete search history.

(56) References Cited

U.S. PATENT DOCUMENTS

| | | | |
|---|---|---|---|
| 2021/0035563 A1* | 2/2021 | Cartwright | G06N 3/084 |
| 2022/0343178 A1* | 10/2022 | Hall | G06N 3/08 |
| 2023/0053716 A1* | 2/2023 | Weinzaepfel | G06N 3/04 |

\* cited by examiner

*Primary Examiner* — Gordon G Liu
(74) *Attorney, Agent, or Firm* — CKC & Partners Co., LLC

(57) ABSTRACT

A data augmentation device including a processor is disclosed. The processor is configured to capture at least one sample image from an original image, and the processor is configured to input the at least one sample image to at least two data augmentation module, so as to generate at least two augmentation image group through the at least two data augmentation module. The at least two data augmentation module include a first data augmentation module and a second data augmentation module, in which a first parameter group of the first data augmentation module is a fixed value, and a second parameter group of the second data augmentation module is not the fixed value.

14 Claims, 6 Drawing Sheets

DATA AUGMENTATION DEVICE, METHOD, AND NON-TRANSITORY COMPUTER READABLE STORAGE MEDIUM

CROSS-REFERENCE TO RELATED APPLICATION

This application claims the priority benefit of U.S. Application Ser. No. 63/362,965, filed Apr. 14, 2022, the full disclosure of which is incorporated herein by reference.

FIELD OF INVENTION

The invention relates to a data augmentation device, a data augmentation method and a non-transitory computer readable storage medium. More particularly, the invention relates to a data augmentation device, a data augmentation method and a non-transitory computer readable storage medium with machine learning.

BACKGROUND

In recent years, in the field of machine learning, the method of self-supervised learning (SSL; self-supervised learning) has been proposed. By training the self-supervised learning module with unlabeled data, it solves the cost of building a large labeled data set and the label quality control problem of the data set. In the method of self-supervised learning, data augmentation is one of the key factors to shorten the training time and to improve the performance of the results.

However, in most data augmentation methods, researchers need to manually design the parameters in the augmentation pipeline, and the parameters in the augmentation pipeline are often preset values that cannot be adjusted randomly. The limited data augmentation set may make the features learned by the self-supervised learning module lack diversity, resulting in low robustness of self-supervised learning module predictions, thus affecting the resulting performance of self-supervised learning module on downstream tasks.

SUMMARY

An aspect of this disclosure is to provide a data augmentation device. The data augmentation device includes a processor. The processor is configured to capture at least one sample image from an original image, and the processor is configured to input the at least one sample image to at least two data augmentation modules, so as to generate at least two augmentation image groups through the at least two data augmentation modules. The at least two data augmentation modules include a first data augmentation module and a second data augmentation module, in which a first parameter group of the first data augmentation module is a fixed value, and a second parameter group of the second data augmentation module is not the fixed value.

Another aspect of this disclosure is to provide a data augmentation method. The data augmentation method includes the following operations: capturing at least one sample image from an original image from a processor; and inputting the at least one sample image to at least two data augmentation modules, so as to generate at least two augmentation image groups through the at least two data augmentation modules by the processor. The at least two data augmentation modules include a first data augmentation module and a second data augmentation module. A first parameter group of the first data augmentation module is a fixed value, and a second parameter group of the second data augmentation module is not the fixed value.

Another aspect of this disclosure is to provide a non-transitory computer readable storage medium. The non-transitory computer readable storage medium is configured to store a computer program. When the computer program is executed, one or more processing elements is configured to perform several operations, including: capturing at least one sample image from an original image; and inputting the at least one sample image to at least two data augmentation modules, so as to generate at least two augmentation image groups through the at least two data augmentation modules. The at least two data augmentation modules include a first data augmentation module and a second data augmentation module. A first parameter group of the first data augmentation module is a fixed value, and a second parameter group of the second data augmentation module is not the fixed value.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
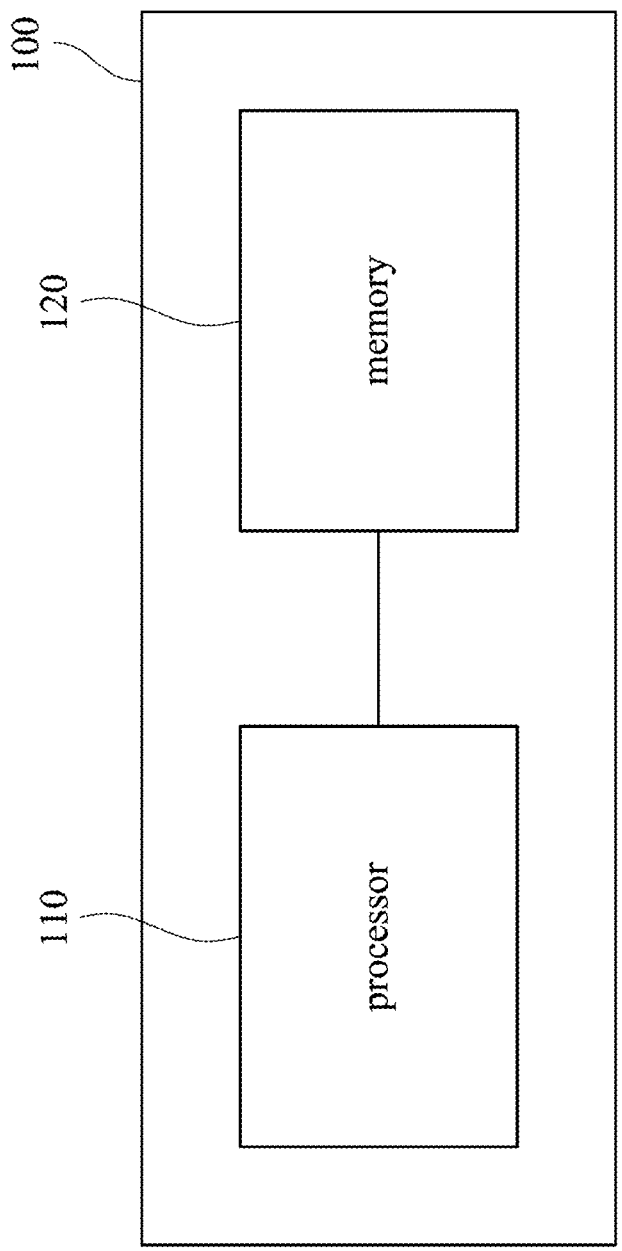
FIG. 1 is a schematic diagram illustrating a data augmentation device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Reference is made to FIG. 1. FIG. 1 is a schematic diagram illustrating a data augmentation device 100 according to some embodiments of the present disclosure. In some embodiments, data augmentation device 100 comprising processor 110 and memory 120. In the connection relationship, the processor 110 is further coupled to the memory 120.

The data augmentation device 100 as illustrated in FIG. 1 is for illustrative purposes only, and the embodiments of the present disclosure are not limited to FIG. 1. The data augmentation device 100 can further include operations and other elements required in the application. For example, the data augmentation device 100 can further include an output interface (for example, a display panel for displaying information), an input interface (for example, a touch panel, a keyboard, a microphone, a scanner or a flash memory reader) and communication circuits (for example, a Wi-Fi communication module, a Bluetooth communication module, a wireless telecommunications network communication module, etc.). In some embodiments, the data augmentation device 100 can be established by a computer, a server or a processing center.

In some embodiments, the memory 120 may be a flash memory, an HDD, an SSD (Solid State Drive), a DRAM (Dynamic Random Access memory) or an SRAM (Static Random Access memory). In some embodiments, the memory 120 may be a non-transitory computer readable storage medium storing at least one instruction associated with a data augmentation method. The processor 110 can access and execute at least one instruction.

In some embodiments, the processor 110 can be, but is not limited to, a single processor or a collection of several microprocessors, such as CPUs or GPUs. The microprocessor is electrically coupled to the memory 120 for accessing and executing the data augmentation method according to at least one instruction. For ease of understanding and illustration, the details of the data augmentation method will be described in the following paragraphs.

Figure 2:
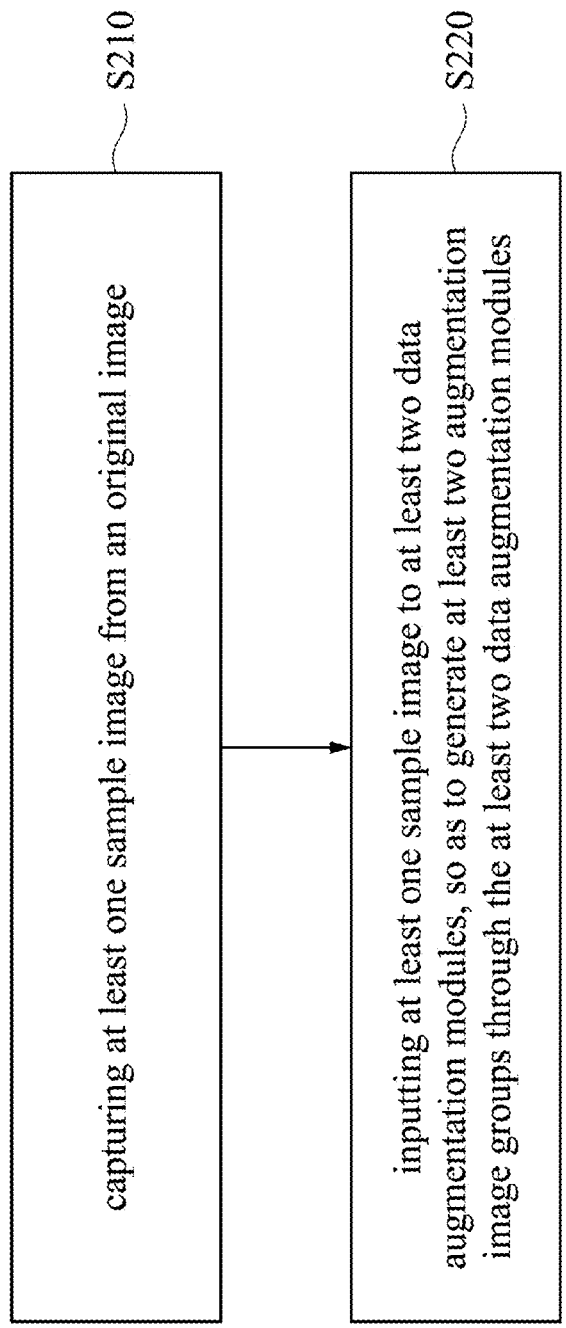
FIG. 2 is a flow chart illustrating a data augmentation method according to some embodiments of the present disclosure.

The details of the embodiments of the present disclosure are disclosed below referring to the data augmentation in FIG. 2. FIG. 2 is a flow chart of the data augmentation method applicable to the data augmentation device 100 in FIG. 1. However, the embodiments of the present disclosure are not limited thereto.

Reference is made to FIG. 2. FIG. 2 is a flow chart illustrating a data augmentation method according to some embodiments of the present disclosure.

It should be noted that, the data augmentation method can be applied to a system having the same or similar structure as the data augmentation device 100 in FIG. 1. In order to simplify the description, the following will take FIG. 1 as an example to describe the data augmentation method. However, the embodiments of the present disclosure are not limited to the application of FIG. 1.

It should be noted that, in some embodiments, the data augmentation method can also be implemented as a computer program stored in a non-transitory computer-readable recording medium, so that the computer, the electronic device, or the aforementioned processor 110 in FIG. 1 reads the recording medium and executes the operation method. The non-transitory computer-readable recording media can be read-only memory, flash memory, floppy disk, hard disk, compact disc, pen drive, magnetic tape, a database accessible over a network, or a non-transitory computer-readable recording media with the same function that a person skilled in the art can easily think of.

In addition, it should be understood that the operations of the operation method mentioned in this embodiment, unless the sequence is specifically stated, can be adjusted according to actual needs, and even can be simultaneously or partially simultaneously implemented.

Furthermore, in different embodiments, these operations can also be adaptively added, replaced, and/or omitted.

Reference is made to FIG. 2. The data augmentation method includes the following operations. For ease of illustration, the detailed operation of the data augmentation method shown in FIG. 2 will be described with reference to FIG. 1 together.

In operation S210, at least one sample image is captured from an original image. In some embodiments, the operation S210 is executed by the processor 110 as shown in FIG. 1. In some embodiments, in operation S210, the processor 110 shown in FIG. 1 captures two sample images from the original image.

Figure 3:
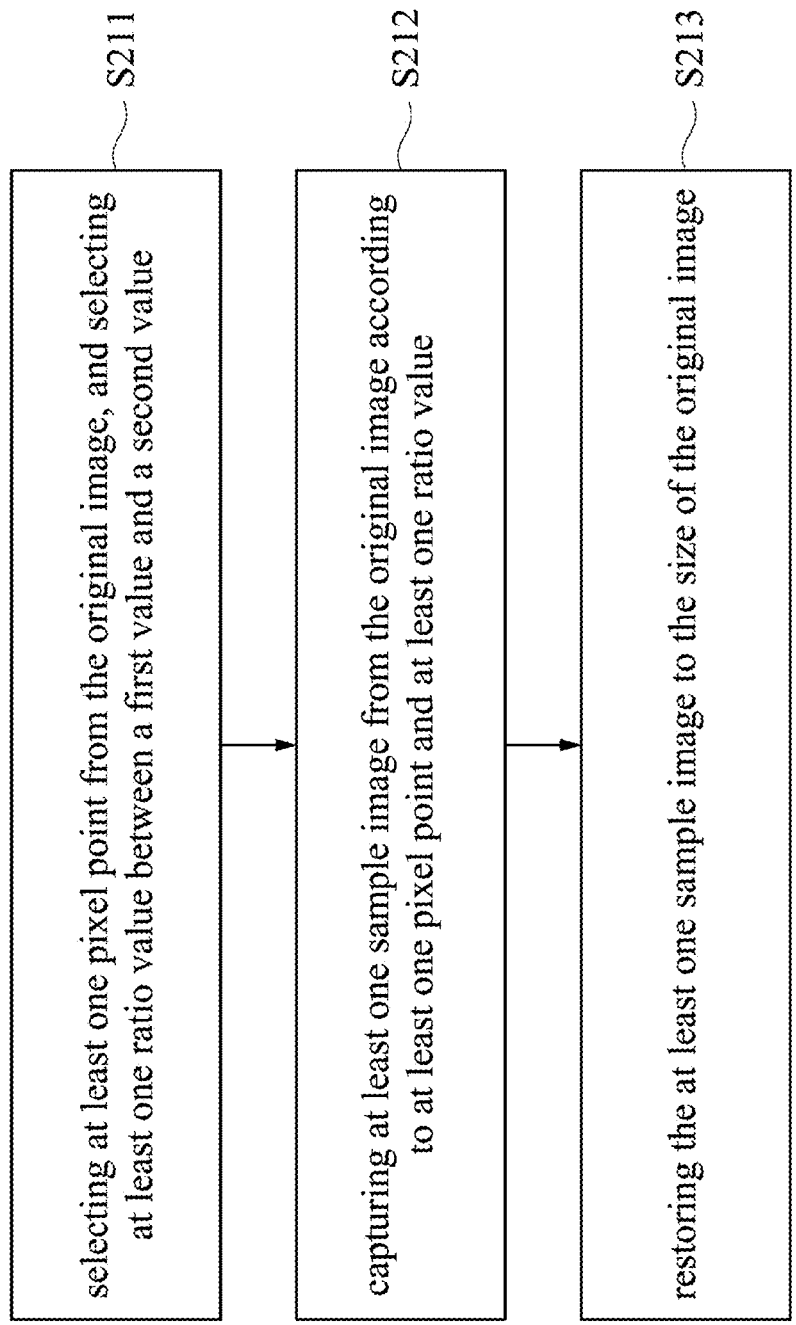
FIG. 3 is a flow chart illustrating an operation illustrated in FIG. 2 according to some embodiments of the present disclosure.

Reference is made to FIG. 3 together. FIG. 3 is a flow chart illustrating operation S210 illustrated in FIG. 2 according to some embodiments of the present disclosure. In some embodiments, operation S210 includes operation S211 to operation S213.

In operation S211, at least one pixel point is selected from the original image, and at least one ratio value is selected between a first value and a second value. In some embodiments, operation S211 is performed by the processor 110 as illustrated in FIG. 1. In some embodiments, the first value is 0.5, the second value is 1.0. In some embodiments, the ratio value is uniform distributed between the first value and the second value.

In some embodiments, in operation S211, the processor 110 selects one value or two values between the first value and the second value as the first ratio value and the second ratio value. In some embodiments, the first ratio value and the second ratio value are the same. In some other embodiments, the first ratio value and the second ratio value are different. The first ratio value is the capture ratio of the first sample image corresponding to the original image, and the second ratio value is the capture ratio of the second sample image corresponding to the original image.

In operation S212, at least one sample image is captured from the original image according to at least one pixel point and at least one ratio value. In some embodiments, operation S212 includes capturing the first sample image from the original image according to the first pixel point and the first ratio value, and capturing the second sample image from the original image according to the second pixel point and the second ratio value. In an embodiment, the first pixel point and the second pixel point are generated at random coordinates from the original image. The first pixel point and second pixel point are selected from the original image by the processor 110. For example, in operation 1, a pixel point is randomly selected from the original image according to the size of the original image. In operation 2, the ratio value is multiplied by the width height of the original image, so as to calculate the "corresponding" width height value of the captured block. In operation 3, the pixel point of operation 1 is taken as the center, and the position of the captured block is calculated according to the width height value of the captured block so as to obtain the corresponding sample image. In some embodiments, operation S212 is operated by the processor 110 as illustrated in FIG. 1.

Figure 4:
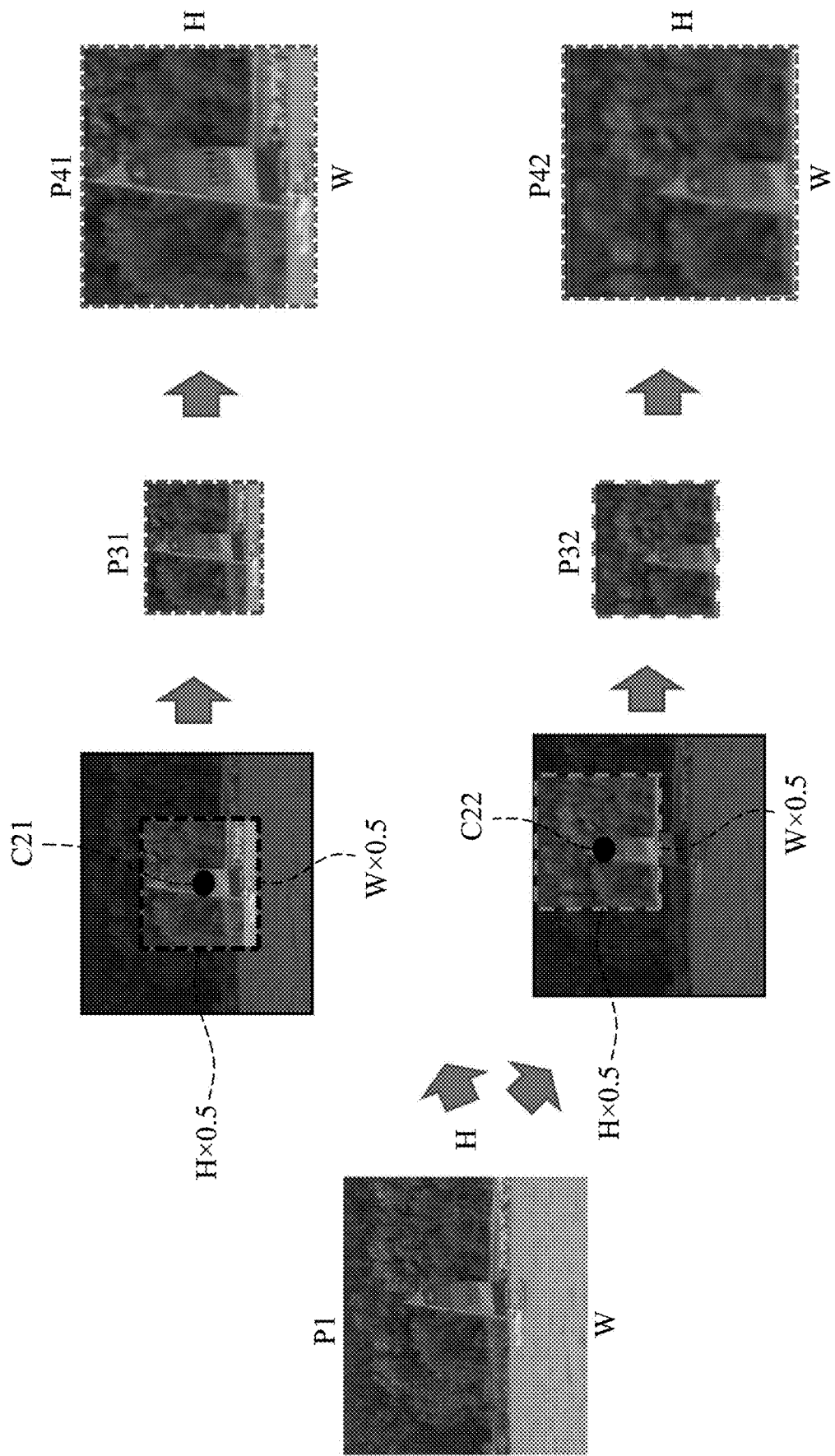
FIG. 4 is a schematic diagram illustrating an example of the S210 operation illustrated in FIG. 2 according to some embodiments of the present disclosure.

For example, reference is made to FIG. 4 together. FIG. 4 is a schematic diagram illustrating an example of operation S210 illustrated in FIG. 2 according to some embodiments of the present disclosure. As illustrated in FIG. 4, the width of the original image P1 is W, and the height of the original image P1 is H. When the ratio value is 0.5, the processor 110 in FIG. 1 captures the sample image P31 from the original image P1 according to the pixel point C21 and the ratio value 0.5, and the processor 110 captures the sample image P32 from the original image P1 capture according to the pixel point C22 and ratio value 0.5. The width of the sample image P31 and the sample image P32 is W×0.5, while the height of the sample image P31 and the sample image P32 is H×0.5. That is to say, the ratio value 0.5 is the width of the sample image P31 and the sample image P32 corresponding to the width of original image P1, and the ratio value 0.5 is also the height of the sample image P31 and the sample image P32 corresponding to the height of original image P1.

In some embodiments, the positions of the pixel point C21 and the pixel point C22 are pixel points randomly selected from the original image P1. The pixel point C21 is a center point of the sample image P31, and the pixel point C22 is a center point of the sample image P32.

In operation S213, the at least one sample image is restored to the size of the original image. In some embodiments, operation S213 is operated by the processor 110 as illustrated in FIG. 1. In an embodiment, the above mentioned restoring method is up-sampling, and the up-sampling method is bilinear up-sampling method.

Reference is made to FIG. 4 together. After the processor 110 captures the sample image P31 and the sample image P32. The processor 110 restores the size of the sample image P31 to the size of the original image P1, so as to generate the sample image P41. The processor 110 further restores the size of the sample image P32 to the size of the original image P1, so as to generate the sample image P42. As illustrated in FIG. 4, the width of the sample image P41 and the width of the sample image P42 are W. The height of the sample image P41 and the height of the sample image P42 are H.

Reference is made to FIG. 2 again. In operation S220, at least one sample image is input to at least two data augmentation modules, so as to generate at least two augmentation image groups through at least two data augmentation modules. In some embodiments, the operation S220 is operated by the processor 110 as illustrated in FIG. 1.

In some embodiments, in operation S220, the at least two data augmentation modules include a first data augmentation module and a second data augmentation module. The parameter group of the first data augmentation module is a fixed value, and the parameter group of the second data augmentation module is not a fixed value. In some embodiments, the at least two data augmentation modules in operation S220 further include a third data augmentation module. The parameter group of the third data augmentation module is a fixed value.

In some embodiments, the above mentioned second data augmentation module, which includes a parameter group with a fixed value includes a conversion number of times parameter of a single image of a search space and a global parameter per image conversion. The conversion number of times parameter of the single image of the search space is a fixed value, while the global parameter per image conversion is not a fixed value.

In some embodiments, in operation S220, every one of the data augmentation modules includes several image conversion strategies. The sample image generated in operation S210 generates an augmentation image through the image conversion strategy.

Figure 5:
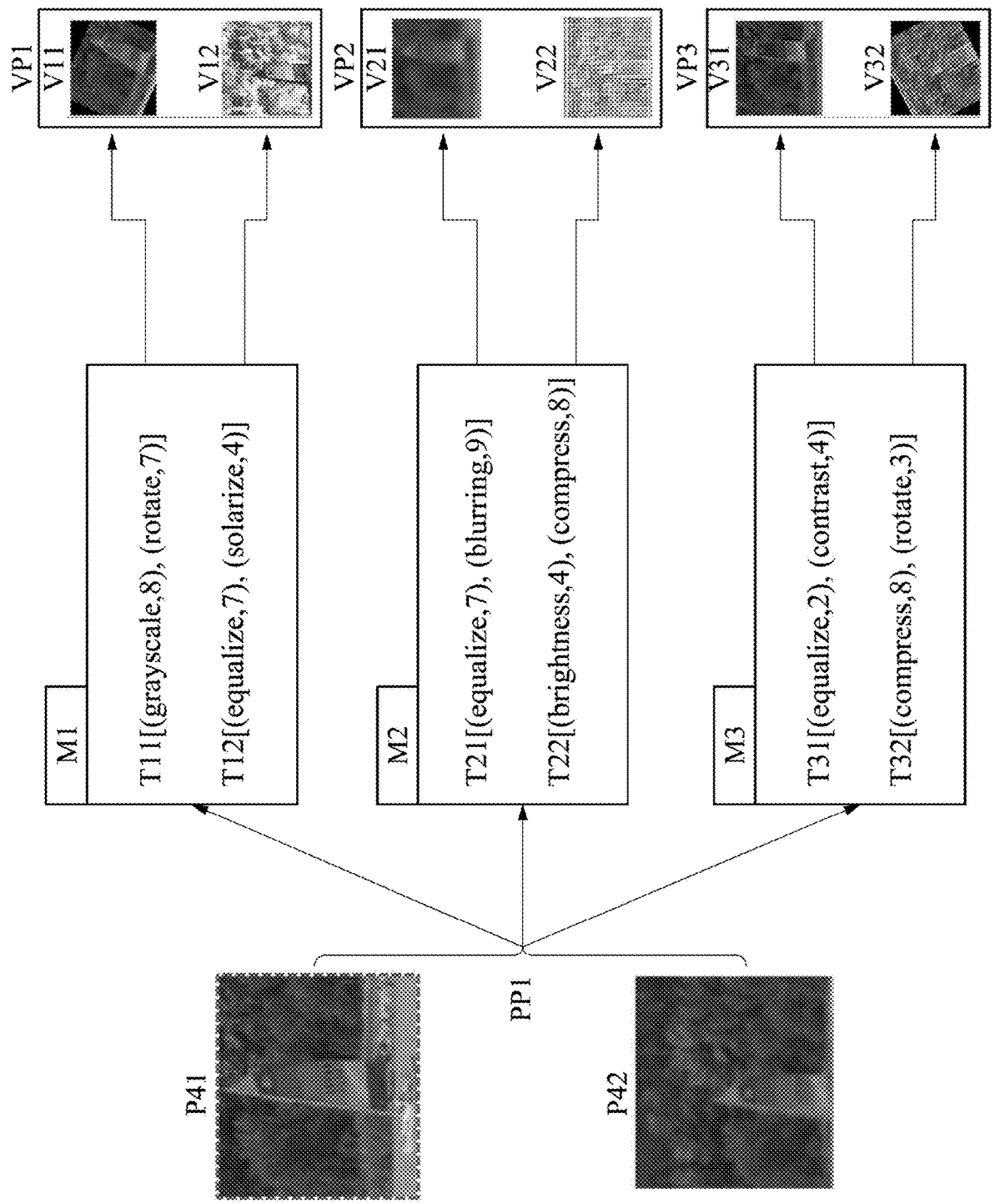
FIG. 5 is a schematic diagram illustrating an example of the S220 operation illustrated in FIG. 2 according to some embodiments of the present disclosure.

For example, reference is made to FIG. 5 together. FIG. 5 is a schematic diagram illustrating an example of operation S220 illustrated in FIG. 2 according to some embodiments of the present disclosure.

In FIG. 5, three data augmentation modules (M1, M2, and M3) are taken as examples for illustration. However, in some embodiments of the present disclosure, the number of the data augmentation module is not limited to three.

The sample image P41 and the sample image P42 in FIG. 5 are sample images generated in the above mentioned operation S210. The sample image P41 and the sample image P42 form the sample image group PP1.

The processor 110 inputs the sample image group PP1 to the data augmentation module M1 so as to generate the augmentation image group VP1. The augmentation image group VP1 includes an augmentation image V11 and an augmentation image V12. The processor 110 inputs the sample image group PP1 to the data augmentation module M2 so as to generate the augmentation image group VP2. The augmentation image group VP2 includes the augmentation image V21 and the augmentation image V22. The processor 110 inputs the sample image group PP1 to the data augmentation module M3 so as to generate the augmentation image group VP3. The augmentation image group VP3 includes the augmentation image V31 and the augmentation image V32.

In some embodiments, the sample image generates an augmentation image through one of the several image conversion strategies in the data augmentation module.

In detail, in the case of the data augmentation module M1, the sample image P41 generates the augmentation image V11 through the image conversion strategy T11 [(grayscale, 8), (rotate, 7)] of the data augmentation module M1. The sample image P42 generates the augmentation image V12 through the image conversion strategy T12 [(equalize, 7), (solarize, 4)] of the data augmentation module M1.

In the case of the data augmentation module M2, the sample image P41 generates the augmentation image V21 through the image conversion strategy T21 [(equalize, 7), (blurring, 9)] of the data augmentation module M2. The sample image P42 generates the augmentation image V22 through the image conversion strategy T22 [(brightness, 4), (compress, 8)] of the data augmentation module M2.

In the case of the data augmentation module M3, the sample image P41 generates the augmentation image V31 through the image conversion strategy T31 [(equalize, 2), (contrast, 4)] of the data augmentation module M3. The sample image P42 generates the augmentation image V32 through the image conversion strategy T32 [(compress, 8), (rotate, 3)] of the data augmentation module M3.

It should be noted that, the image conversion strategies included in the data augmentation modules M1 to M3 are not limited to the image conversion strategies T11, T12, T21, T22, T31, and T32 as mentioned above. Each of the data augmentation modules M1 to M3 includes several different image conversion strategies. When converting, select one or more of the image conversion strategies is selected for conversion.

Furthermore, each of the above mentioned image conversion strategies T11, T12, T21, T22, T31, T32 includes two image conversion strategies and two image conversion strategies with image conversion strategy parameters respectively. For example, the image conversion strategy T11 includes the image conversion strategy grayscale and the image conversion strategy rotate. The image conversion strategy parameter of the image conversion strategy grayscale is 8, and the image conversion strategy parameter of the image conversion strategy rotate is 7. It should be noted that, the above mentioned image conversion strategy parameters can be normalization parameters. The range of the value of the normalization parameters is 0 to 10. 0 means that the intensity of the image conversion is lowest (the effect is equivalent to no image conversion). In contrary, 10 mean that the intensity of the image conversion is strongest. However, the embodiments of the present disclosure are not limited to the numbers of the image conversion strategies mentioned above. In some other embodiments, the image conversion strategies T11, T12, T21, T22, T31, and T32 can include more image conversion strategies or can include only one image conversion strategy.

In an embodiment of the present disclosure, the data augmentation module M1 adopts auto data augmentation. The data augmentation module M2 adopts fast auto data augmentation. The data augmentation module M3 adopts random data augmentation. The parameter groups of the image conversion strategies of the auto data augmentation module and the fast auto data augmentation module are fixed values, and the parameter group of the random data augmentation module is not a fixed value.

The parameter group of the auto data augmentation module adopted by the data augmentation module M1 includes the image conversion strategy parameter number (number of sub-policy) and the global parameter per image conversion (number of conversion in each sub-policy). In some embodiments, the policy type of the auto data augmentation module is the imagenet data set. That is, the most suitable data conversion parameter searched for the imagenet data set. The image conversion strategy parameter number is 24. That is, the data augmentation module M1 includes 24 image conversion strategies, and the global parameter per image conversion is 2. That is, each image will go through two image conversions in sequence.

The parameter group of the fast auto data augmentation module adopted by the data augmentation module M2 includes the image conversion strategy parameter number (number of sub-policy) and the global parameter per image conversion (number of conversion in each sub-policy). In some embodiments, the image conversion strategy parameter number of the fast auto data augmentation module is 24. That is, the data augmentation module M2 includes 24 image conversion strategies, and the global parameter per image conversion is 2. In some embodiments, the policy type of the auto data augmentation module is the imagenet data set. That is, the most suitable data conversion parameter searched for imagenet data set.

The parameter group of the random data augmentation module adopted by the data augmentation module M3 includes the conversion number of times parameter of the single image of the search space (number of conversion in searching space) and the global parameter per image conversion (number of conversion in each sub-policy). In some embodiments, the policy type of the random data augmentation module is the imagenet, the conversion number of times parameter of the single image of the search space is 14, and the global parameter per image conversion is 1.

In some embodiments, the policy type of the data augmentation module M1, the image conversion strategy parameter and the global parameter per image conversion, the policy type of the data augmentation module M2, the image conversion strategy parameter and the global parameter per image conversion are all fixed value. The policy types of the data augmentation module M1 and M2, the image conversion strategy parameter and the global parameter per image conversion are fixed values that are preset before executing the data augmentation method in the embodiments of the present disclosure and will not be changed when the data augmentation method in the embodiments of the present disclosure are executed.

In some embodiments, the policy type of the data augmentation module M3, the conversion number of times parameter of the single image of the search space are fixed values that are preset before executing the data augmentation method in the embodiments of the present disclosure and will not be changed when the data augmentation method in the embodiments of the present disclosure are executed. On the other hand, the conversion number of times parameter of the data augmentation module M3 is not fixed value and is not preset before executing the data augmentation method in the embodiments of the present disclosure. Instead, according to the implementation of the data augmentation method and the subsequent machine learning method in the embodiments of the present disclosure, the conversion number of times parameter of the data augmentation module M3 will continue to be dynamically adjusted according to the results of the machine learning method.

In some embodiments, several augmentation images generated by the data augmentation method are configured to be provided to the processor 110 for machine learning operations.

In some embodiments, the data augmentation modules M1, M2, and M3 can be implemented as a circuit/element respectively (such as data augmentation circuit/element). In some embodiments, the data augmentation modules M1, M2, and M3 are stored in the memory 120 in FIG. 1 and are read and execute by the processor 110 in FIG. 1.

Figure 6:
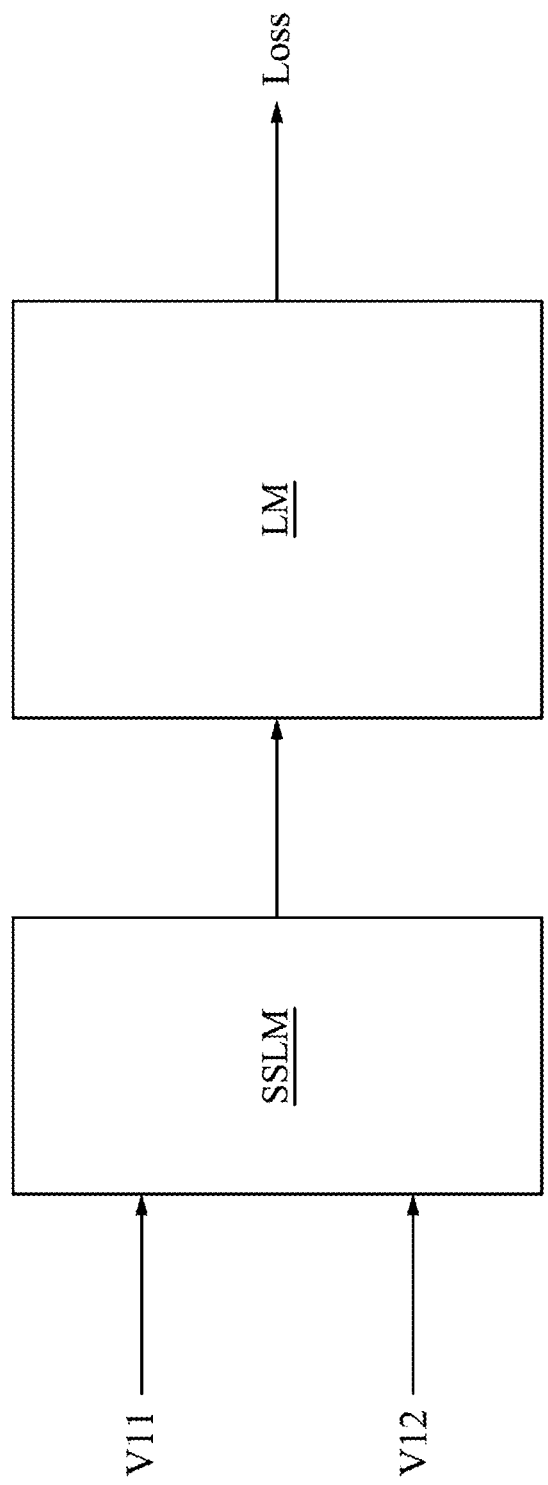
FIG. 6 is a schematic diagram illustrating an example of distance loss calculation according to some embodiments of the present disclosure.

Reference is made to FIG. 6. FIG. 6 is a schematic diagram illustrating an example of distance loss calculation according to some embodiments of the present disclosure. In some embodiments, the processor 110 in FIG. 1 is further configured to input several augmentation images to the self-supervised learning module SSLM, and the processor 110 is further configured to input the output of the self-supervised learning module SSLM to the distance loss calculation module LM to calculate several image representations. The several image representations are corresponding outputs of the several augmentation image group input to the module. The processor 110 is further configured to calculate several distance loss Loss according to the several image representations, and the processor 110 is further configured to add up the several distance loss Loss to calculate the total loss. The total loss is configured to evaluate the efficacy of the pre-training of the self-supervised learning module.

In some embodiments, the distance loss is calculated by the adopted iterative method. In detail, reference is made to FIG. 5 together. FIG. 5 includes several augmentation images V11 to V32. When calculating the distance loss, the processor 110 in FIG. 1 inputs two of the several augmentation images V11 to V32 to the self-supervised learning module SSLM and the distance loss calculation module LM, so as to calculate the distance loss between two of the several augmentation images V11 to V32.

In detail, the processor 110 in FIG. 1 inputs the augmentation images V11 and V12 to the self-supervised learning module SSLM and the distance loss calculation module LM, so as to calculate the distance loss Loss11. The processor 110 inputs the augmentation images V11 and V21 to the self-supervised learning module SSLM and the distance loss calculation module LM, so as to calculate the distance loss Loss12. The processor 110 inputs the augmentation images V11 and V22 to the self-supervised learning module SSLM and the distance loss calculation module LM, so as to calculate the distance loss Loss13. The processor 110 inputs the augmentation images V11 and V31 to the self-supervised learning module SSLM and the distance loss calculation module LM, so as to calculate the distance loss Loss14. The processor 110 inputs the augmentation images V11 and V32 to the self-supervised learning module SSLM and the distance loss calculation module LM, so as to calculate the distance loss Loss15.

Then, the processor 110 in FIG. 1 inputs the augmentation images V12 and V21 to the self-supervised learning module SSLM and the distance loss calculation module LM, so as to calculate the distance loss Loss21. The processor 110 inputs the augmentation images V12 and V22 to the self-supervised learning module SSLM and the distance loss calculation module LM, so as to calculate the distance loss Loss22. The processor 110 inputs the augmentation images V12 and V31 to the self-supervised learning module SSLM and the distance loss calculation module LM, so as to calculate the distance loss Loss23. The processor 110 inputs the augmentation images V12 and V32 to the self-supervised learning module SSLM and the distance loss calculation module LM, so as to calculate the distance loss Loss24.

Then, the processor 110 in FIG. 1 inputs the augmentation images V21 and V22 to the self-supervised learning module SSLM and the distance loss calculation module LM, so as to calculate the distance loss Loss31. The processor 110 inputs the augmentation images V21 and V31 into the self-supervised learning module SSLM and the distance loss calculation module LM, so as to calculate the distance loss Loss32. The processor 110 inputs the augmentation images V21 and V32 to the self-supervised learning module SSLM and the distance loss calculation module LM, so as to calculate the distance loss Loss33.

Then, the processor 110 in FIG. 1 inputs the augmentation images V22 and V31 to the self-supervised learning module SSLM and the distance loss calculation module LM, so as to calculate the distance loss Loss41. The processor 110 inputs the augmentation images V22 and V32 to the self-supervised learning module SSLM and the distance loss calculation module LM, so as to calculate the distance loss Loss42.

Then, The processor 110 in FIG. 1 inputs the augmentation images V31 and V32 to the self-supervised learning module SSLM and the distance loss calculation module LM, so as to calculate the distance loss Loss51.

The processor 110 in FIG. 1 adds up the above mentioned distance losses Loss11 to Loss15, distance losses Loss21 to Loss24, distance losses Loss31 to Loss33, distance losses Loss41 to Loss42, and distance loss Loss51, so as to obtain the total loss.

The total loss can be configured to evaluate the training results of the self-supervised learning module SSLM. In some embodiments, the distance loss calculation module LM is adopted self-supervised (BYOL; bootstrap your own latent) way to calculate the distance loss. However, the embodiments of the present disclosure are not limited thereto. Several methods for obtaining the distance loss are within the embodiments of the present disclosure.

According to the embodiment of the present disclosure, it is understood that the embodiment of the present disclosure is to provide a data augmentation device, a data augmentation method and a non-transitory computer readable storage medium. First, the capture method for obtaining a sample image from an original image described in the embodiments of the present disclosure can adapt to the size and characteristics of different target objects and can obtain feature details of different types of target objects. Second, the embodiments of the present disclosure combine the data augmentation module with a fixed parameter group and the data augmentation module with an unfixed parameter group. The augmentation image generated by the embodiments of the present disclosure is more adaptable than the data augmentation module with a fixed parameter group. On the other hand, the augmentation image produced by the disclosure has more robust features and the module training is more stable than the data augmentation module that only uses the parameter group is not fixed. Overall, the embodiments of the present disclosure have better data efficiency.

The augmentation image generated by the data augmentation device and the data augmentation method provided by the embodiments of the present disclosure can effectively help pre-training such as self-supervised learning module SSLM in FIG. 6, and in turn, the self-supervised learning module SSLM can have better results in performing downstream tasks. The downstream tasks include but are not limited to classification tasks, object detection tasks, image segmentation tasks, etc.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A data augmentation device, comprising:
   a processor, configured to capture at least one sample image from an original image, and to input the at least one sample image to at least two data augmentation modules, so as to generate at least two augmentation image groups through the at least two data augmentation modules;
   wherein the at least two data augmentation modules comprise a first data augmentation module and a second data augmentation module, wherein a first parameter group of the first data augmentation module is a fixed value, and a second parameter group of the second data augmentation module is not the fixed value;
   wherein the processor is further configured to select at least one pixel point from the original image, to select at least one ratio value between a first value and a second value, and to capture the at least one sample image in accordance to the original image according to the at least one pixel point and the at least one ratio value, wherein the at least one pixel point is a center point of the at least one sample image, the at least one ratio value is a width of the at least one sample image corresponding to a width of the original image, and the at least one ratio value is a height of the at least one sample image corresponding to a height of the original image;

wherein the at least one sample image comprises a first sample image and a second sample image, wherein the processor is further configured to obtain the first sample image according to a first pixel point and the at least one ratio value, and the processor is further configured to obtain the second sample image according to a second pixel point and the at least one ratio value, wherein the first pixel point and the second pixel point are randomly selected;

wherein the processor is further configured to restore the size of the least one sample image to the size of the original image.

2. The data augmentation device of claim 1, wherein the second parameter group comprises a conversion number of times parameter of a single image of a search space and a global parameter per image conversion, wherein a conversion number of times parameter of the single image of the search space is the fixed value, and the global parameter per image conversion is not the fixed value.

3. The data augmentation device of claim 1, wherein the at least two data augmentation modules further comprise a third data augmentation module, and a third parameter group of the third data augmentation module is the fixed value.

4. The data augmentation device of claim 1, wherein the processor is further configured to input the at least one sample image to the first data augmentation module so as to generate a first augmentation image group of the at least two augmentation image groups, and to input the at least one sample image to the second data augmentation module so as to generate a second augmentation image group of the at least two augmentation image groups, wherein the processor is further configured to calculate a total loss according to the first augmentation image group and the second augmentation image group.

5. The data augmentation device of claim 1, wherein each of the first data augmentation module and the second data augmentation module comprises a plurality of image conversion strategies, wherein the at least one sample image is further configured to generate the at least two augmentation image groups through the plurality of image conversion strategies.

6. A data augmentation method, comprising:
capturing at least one sample image from an original image from a processor; and
inputting the at least one sample image to at least two data augmentation modules, so as to generate at least two augmentation image groups through the at least two data augmentation modules by the processor;
wherein the at least two data augmentation modules comprise a first data augmentation module and a second data augmentation module, wherein a first parameter group of the first data augmentation module is a fixed value, and a second parameter group of the second data augmentation module is not the fixed value;
wherein the data augmentation method further comprises:
selecting at least one pixel point from the original image, and selecting at least one ratio value between a first value and a second value; and
capturing the at least one sample image from the original image according to the at least one pixel point and the at least one ratio value;

wherein the at least one pixel point is a center point of the at least one sample image, the at least one ratio value is a width of the at least one sample image corresponding to a width of the original image, and the at least one ratio value is a height of the at least one sample image corresponding to a height of the original image;

wherein the at least one sample image comprises a first sample image and a second sample image, wherein the data augmentation method further comprises:
obtaining the first sample image according to a first pixel point and the at least one ratio value, and obtaining the second sample image according to a second pixel point and the at least one ratio value, wherein the first pixel point and the second pixel point are randomly selected;

wherein the data augmentation method further comprises:
restoring the size of the least one sample image to the size of the original image.

7. The data augmentation method of claim 6, wherein the second parameter group comprises a conversion number of times parameter of a single image of a search space and a global parameter per image conversion, wherein a conversion number of times parameter of the single image of the search space is the fixed value, and the global parameter per image conversion is not the fixed value.

8. The data augmentation method of claim 6, wherein the at least two data augmentation modules further comprise a third data augmentation module, wherein a third parameter group of the third data augmentation module is the fixed value.

9. The data augmentation method of claim 6, further comprising:
inputting the at least one sample image to the first data augmentation module so as to generate a first augmentation image group of the at least two augmentation image groups, and inputting the at least one sample image to the second data augmentation module so as to generate a second augmentation image group of the at least two augmentation image groups; and
calculating a total loss according to the first augmentation image group and the second augmentation image group.

10. The data augmentation method of claim 6, wherein each one of the first data augmentation module and the second data augmentation module comprises a plurality of image conversion strategies, wherein the at least one sample image is further configured to generate the at least two augmentation image groups through the plurality of image conversion strategies.

11. A non-transitory computer readable storage medium, configured to store a computer program, wherein when the computer program is executed, one or more processing elements is configured to perform a plurality of operations, comprising:
capturing at least one sample image from an original image; and
inputting the at least one sample image to at least two data augmentation modules, so as to generate at least two augmentation image groups through the at least two data augmentation modules;
wherein the at least two data augmentation modules comprise a first data augmentation module and a second data augmentation module, wherein a first parameter group of the first data augmentation module is a fixed value, and a second parameter group of the second data augmentation module is not the fixed value;

wherein the plurality of operations further comprises:
selecting at least one ratio value between a first value and a second value; and
capturing the at least one sample image from the original image according to the least one ratio value, wherein the least one ratio value is a width of the at least one sample image corresponding to a width of the original image, and the least one ratio value is a height of the at least one sample image corresponding to a height of the original image;

wherein the at least one sample image comprises a first sample image and a second sample image, wherein the plurality of operations further comprises:
obtaining the first sample image according to a first pixel point and the at least one ratio value, and obtaining the second sample image according to a second pixel point and the at least one ratio value, wherein the first pixel point and the second pixel point are randomly selected;

wherein the plurality of operations further comprises:
restoring the size of the least one sample image to the size of the original image.

12. The non-transitory computer readable storage medium of claim 11, wherein the second parameter group comprises a conversion number of times parameter of a single image of a search space and a global parameter per image conversion, wherein a conversion number of times parameter of the single image of the search space is the fixed value, and the global parameter per image conversion is not the fixed value.

13. The non-transitory computer readable storage medium of claim 11, wherein the plurality of operations comprises:
inputting the at least one sample image to the first data augmentation module so as to generate a first augmentation image group of the at least two augmentation image groups, and inputting the at least one sample image to the second data augmentation module so as to generate a second augmentation image group of the at least two augmentation image groups; and
calculating a total loss according to the first augmentation image group and the second augmentation image group.

14. The non-transitory computer readable storage medium of claim 11, wherein each one of the first data augmentation module and the second data augmentation module comprises a plurality of image conversion strategies, wherein the at least one sample image is further configured to generate the at least two augmentation image groups through the plurality of image conversion strategies.

* * * * *